US011627695B2

(12) United States Patent
Donadon et al.

(10) Patent No.: US 11,627,695 B2
(45) Date of Patent: Apr. 18, 2023

(54) SOWING ELEMENT FOR PRECISION AGRICULTURAL SEEDERS AND SEEDER INCLUDING ELEMENT OF THIS KIND

(71) Applicant: MASCHIO GASPARDO S.P.A., Campodarsego (IT)

(72) Inventors: Gianfranco Donadon, Concordia Sagittaria (IT); Luigi Giovanni Bot, Portogruaro (IT); Bruno Miolo, Concordia Sagittaria (IT)

(73) Assignee: Machio Gaspardo S.P.A., Campodarsego (IT)

( * ) Notice: Subject to any disclaimer, the term of this patent is extended or adjusted under 35 U.S.C. 154(b) by 220 days.

(21) Appl. No.: 16/761,456

(22) PCT Filed: Oct. 26, 2018

(86) PCT No.: PCT/IB2018/058386
§ 371 (c)(1),
(2) Date: May 4, 2020

(87) PCT Pub. No.: WO2019/092538
PCT Pub. Date: May 16, 2019

(65) Prior Publication Data
US 2020/0396896 A1  Dec. 24, 2020

(30) Foreign Application Priority Data

Nov. 10, 2017  (IT) .......................... 102017000128607
Oct. 26, 2018  (IT) .......................... 102018000009829

(51) Int. Cl.
*A01C 7/04*  (2006.01)
*A01C 7/08*  (2006.01)
*A01C 7/12*  (2006.01)

(52) U.S. Cl.
CPC .............. *A01C 7/046* (2013.01); *A01C 7/081* (2013.01); *A01C 7/123* (2013.01); *A01C 7/128* (2013.01)

(58) Field of Classification Search
CPC ......... A01C 7/046; A01C 7/081; A01C 7/123; A01C 7/124; A01C 7/125; A01C 7/128
See application file for complete search history.

(56) References Cited

U.S. PATENT DOCUMENTS

2010/0282143 A1* 11/2010 Preheim .................... A01C 7/04
  111/184
2011/0226168 A1*  9/2011 Shoup ..................... A01C 7/046
  111/200

(Continued)

FOREIGN PATENT DOCUMENTS

EP       2683231       7/2016
WO    2017079515     11/2017

*Primary Examiner* — Thomas B Will
*Assistant Examiner* — Ian A Normile
(74) *Attorney, Agent, or Firm* — Janeway Patent Law PLLC; John Janeway

(57) ABSTRACT

Sowing element for precision agricultural seeders comprising a device for selecting the seed, of the type which is formed of a perforated disc having opposing faces that are subject to a pressure differential and a pressurisation device associated with the disc for applying the pressure differential to the faces of the disc, the pressurisation device including a pressurisation bell combined with the disc so as to pneumatically couple thereto in order to guarantee said pressure differential, wherein the bell is rotatably idle with respect to the disc.

16 Claims, 4 Drawing Sheets

(56) References Cited

U.S. PATENT DOCUMENTS

| | | | |
|---|---|---|---|
| 2011/0271887 A1* | 11/2011 | Shoup | A01C 7/046 111/178 |
| 2014/0182496 A1 | 7/2014 | Adams et al. | |
| 2104/0182496 | 7/2014 | Adams et al. | |
| 2015/0334913 A1* | 11/2015 | Gentili | A01C 7/046 111/171 |

* cited by examiner

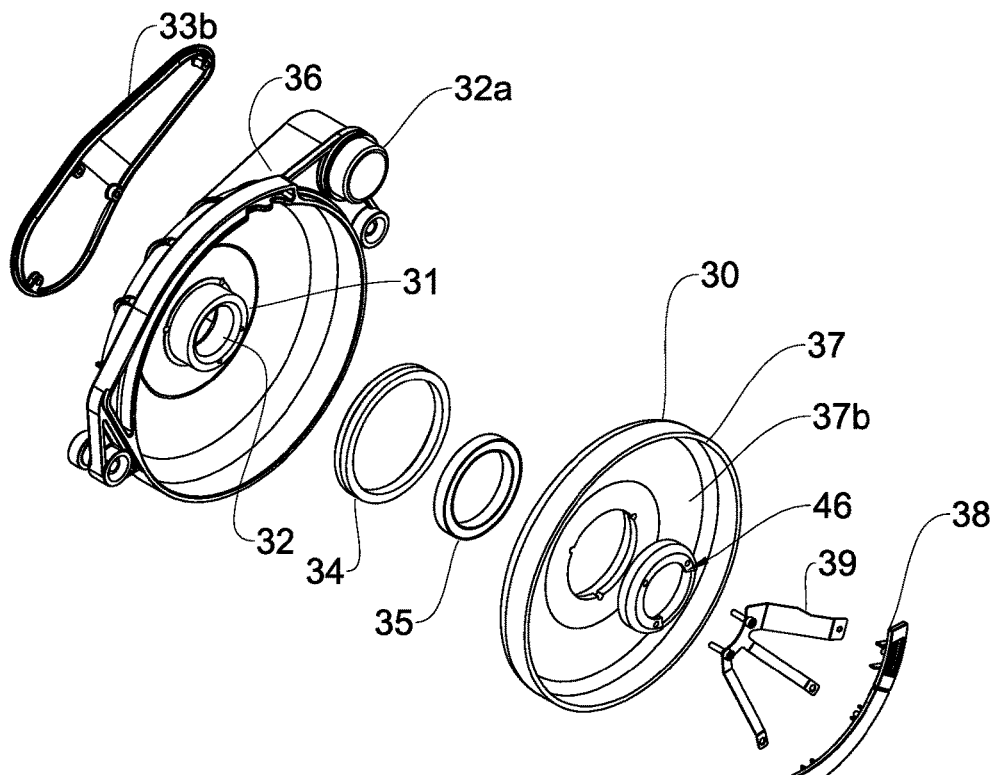
*Fig. 3*
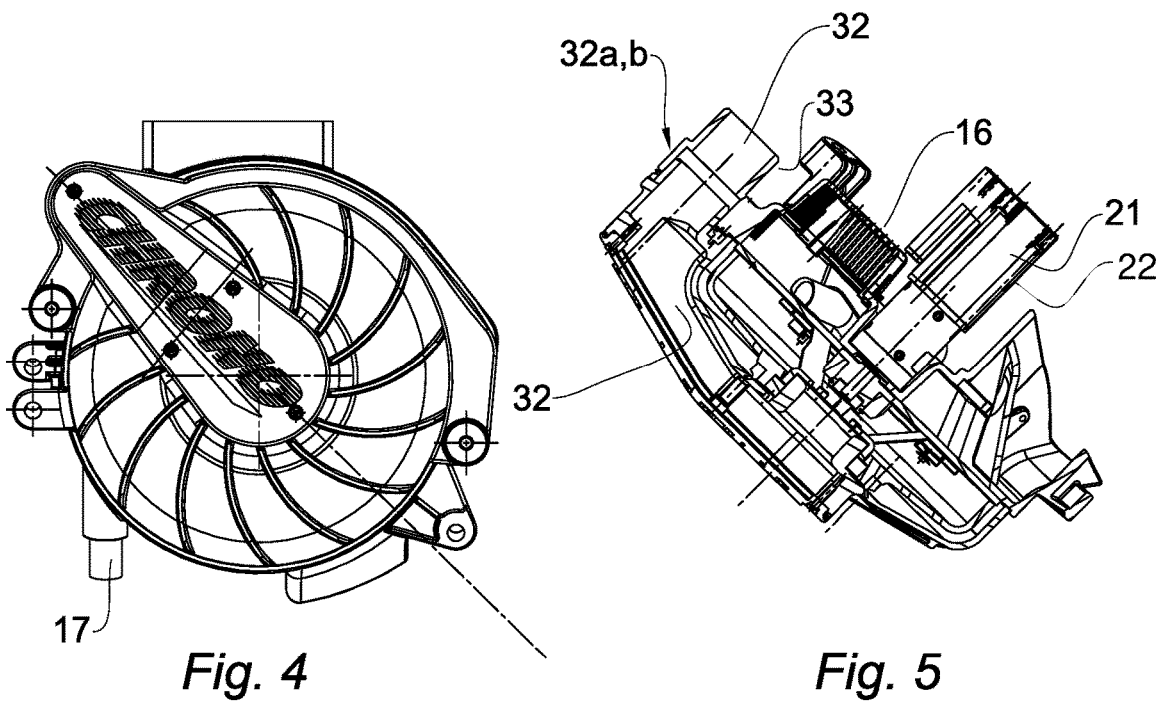
*Fig. 4*          *Fig. 5*

SOWING ELEMENT FOR PRECISION AGRICULTURAL SEEDERS AND SEEDER INCLUDING ELEMENT OF THIS KIND

The present invention relates to a sowing element for precision agricultural seeders and a seeder including an element of this kind.

The problem of precision when sowing is felt in the agricultural sector since the yield of the harvested product substantially depends on the density of plants with respect to the surface unit sown. The sowing density in turn depends on meticulously respecting the distance between two adjacent seeds which are buried in the ground. This measure depends both on the precision design features of the seeder and on the sowing speed. Of course, in order to achieve good profitability it is necessary for the sowing speed to be maximised, so as to allow the operator to sow an even greater number of hectares per hour.

The best results in maximising the sowing speed and sowing precision can be achieved using pneumatic seeders that are provided with a perforated disc distributor that is rotated by electric motors. This allows the rotational speed of the selection disc and therefore the number of seeds deposited per linear metre of the sowing bed to be accurately controlled.

However, the seeding elements designed in this way have several disadvantages, some of which are due to the need to minimise the friction inside the sowing element so as to not interfere with controlling the rotational speed of the electric motors which actuate the selection discs.

US2014/0182496A1 discloses a sowing element comprising a pneumatic device for selecting the seed in which a face of the disc is pressurised (positively or negatively with respect to the ambient pressure) with respect to the other face by means of a bell that is applied to the selection disc so as to jointly rotate therewith and defines therewith a chamber in which there is established the negative pressure outside the aforementioned chamber that is required to adhere a seed at each hole of the disc on the opposite face to same.

This solution offers advantages in terms of pressurising the seed selection device but has quite a few disadvantages.

In fact, this design system makes replacing the selection discs every time the sowing density has to be changed more complicated; for example, in order to change the type of seed used, the separating device has to be dismounted and subsequently remounted in its position. The system for hooking the disc on the bell is necessarily produced along the external crown of the bell by means of screws. Removing the discs requires the screws which fix the disc to the bell to be removed and therefore to be repositioned when applying the new disc. Moreover, a system for temporarily locking the rotation of the bell needs to be provided in order to allow the disc to be easily unhooked.

A further disadvantage stems from the fact that, using this structure, the motion is imparted to the disc by the bell and, for this reason, the bell is mounted on the fixed part of the box-shaped body of the seed selection device. In contrast, the chamber for containing the seed (drawing chamber) is made in the movable part or cover. As a result, every time work needs to be done on the disc, it is necessary for the chamber containing the seed and the tank that feeds said chamber by gravity to be completely emptied.

A further aspect relates to the positioning of the air aspiration tubes which connect each sowing element to the pneumatic vacuum generator. In a situation of this kind, in fact, the positioning of said tubes cannot be optimised. Other measures relate to the system for interrupting the vacuum on the face of the disc that is subjected to a vacuum, which system is used to cause the seed to fall into the seed descent duct, and also relate to the internal geometry of the chamber.

Nevertheless, there is the fact that if the bell is also only temporarily locked or decelerated, the correct rotation of the sowing disc is not ensured.

Reference is also made to WO2017/079515 and EP2683231.

The technical problem addressed by the present invention is that of developing a sowing element for precision agricultural seeders which is structurally and functionally designed to remedy all of the disadvantages described with reference to the cited prior art.

This problem is solved according to the invention by means of a sowing element produced in accordance with the accompanying claims.

By using a bell that is idly supported in the sowing element with respect to the seed selection disc, it is possible to maintain and especially to support the selection disc inside the sowing element in a completely autonomous way with respect to the bell such that the sowing disc is accessible and can be replaced without using measures other than simply opening the element itself without any intervention on the bell.

Moreover, the rotation of the sowing disc is not negatively influenced by possible deceleration or locking of the bell, thereby ensuring greater precision in sowing plants per surface unit.

The dragging effect between the bell and the sowing disc is in fact not essential, but is however ensured by the condition of contact between the bell and the disc, owing to the friction of the respective contact surfaces. The design of the bell and of the selection disc is in fact made simpler by adopting peripheral dragging of this kind caused by friction between the disc and the bell.

The features and advantages of the invention will become clearer from the detailed description of a preferred embodiment thereof, shown by way of non-restrictive example and with reference to the accompanying drawings, in which:

FIG. 3 is an exploded perspective view of the same detail in FIG. 2, viewed from a different angle;

FIGS. 4 and 5 are a front elevation and sectional view along the line V-V in FIG. 4, respectively, of the same detail;

Figure 1:
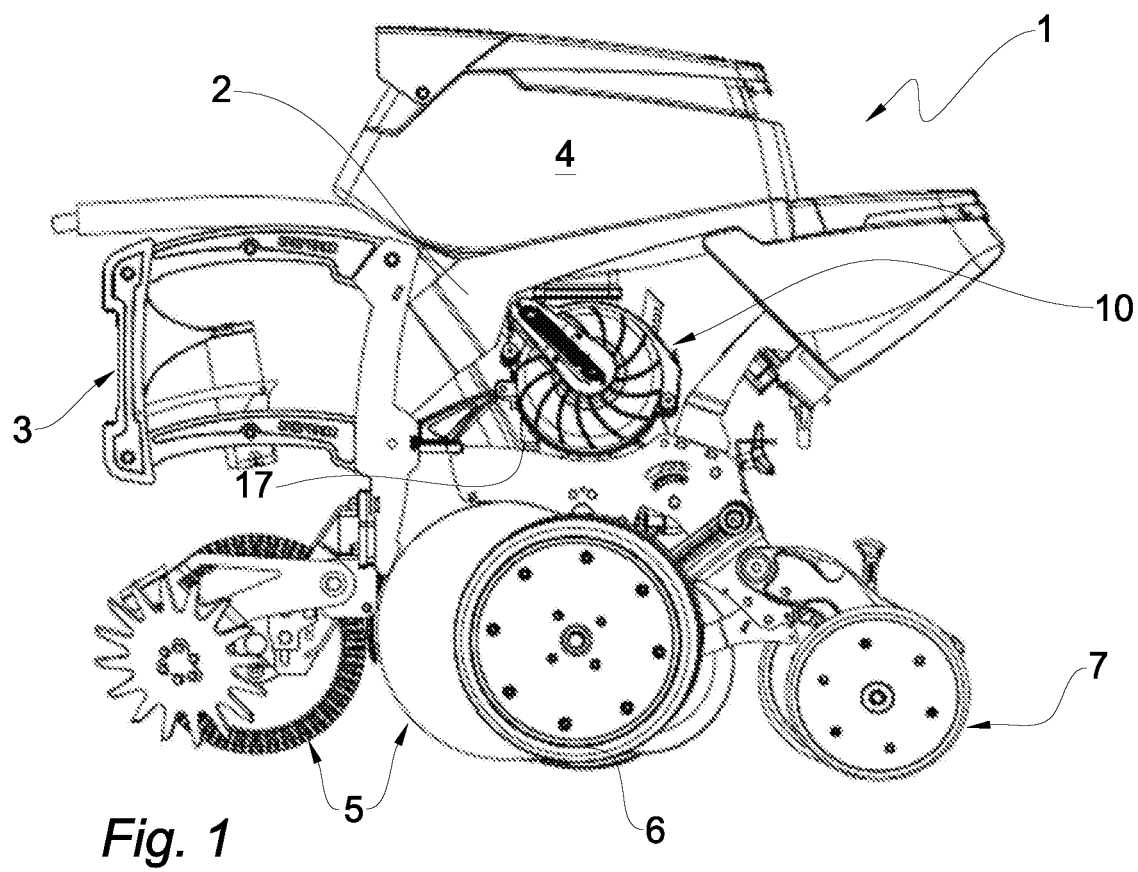
FIG. 1 is a front elevation of a sowing element for precision agricultural seeders, which sowing element is produced according to the invention.
Figure 2:
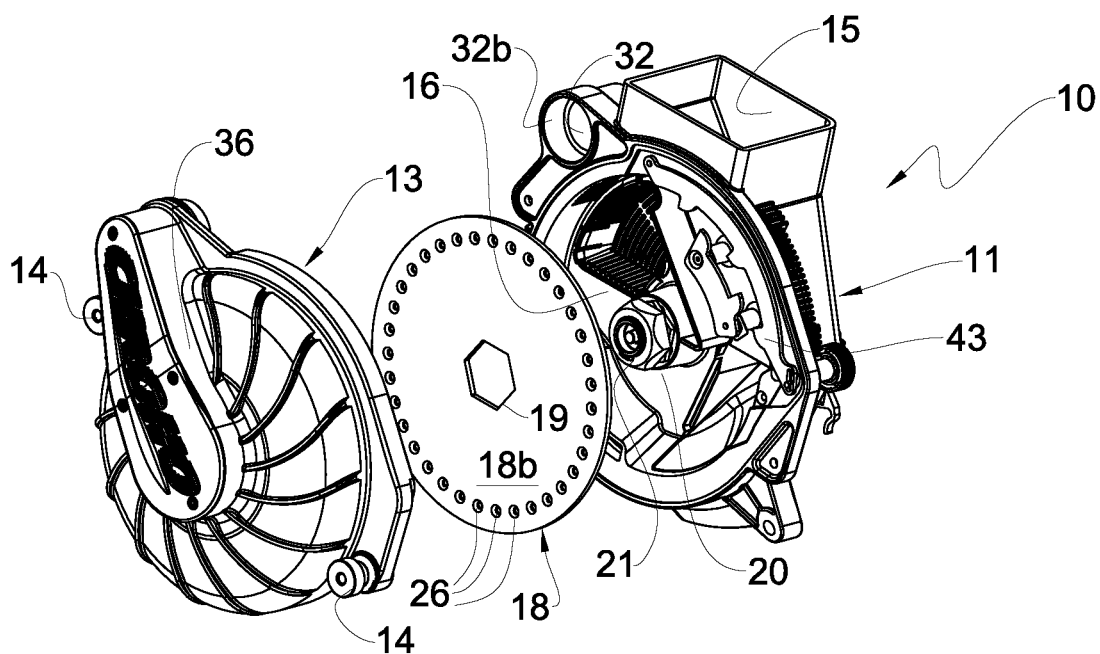
FIG. 2 is an exploded perspective view of a detail of the element in FIG. 1.
Figure 7:
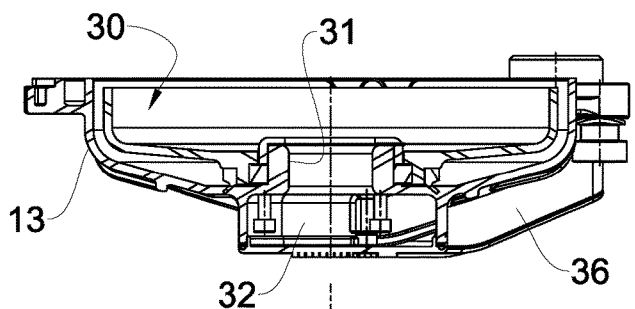
FIGS. 6 and 7 are a front elevation and sectional view along the line VI-VI in FIG. 6, respectively, of a component of the detail in the preceding figures.
Figure 6:
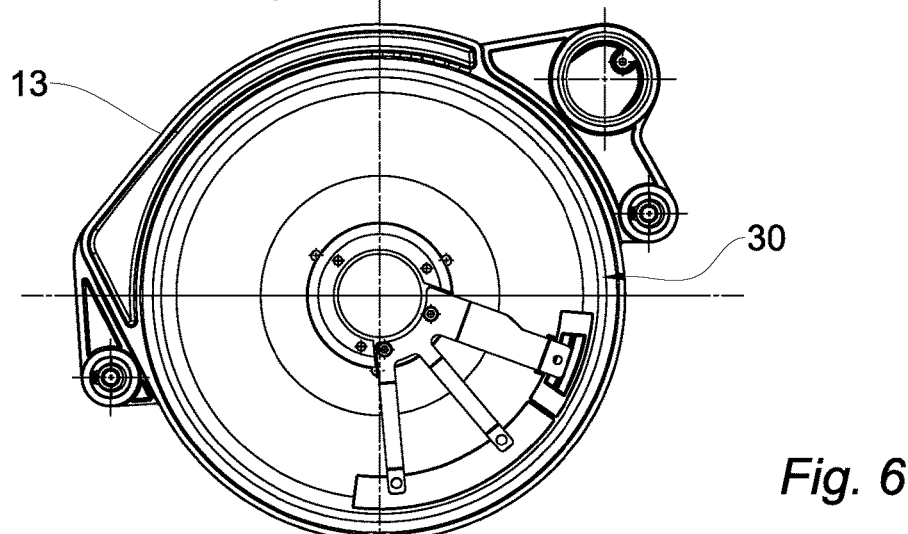
Figure 8:
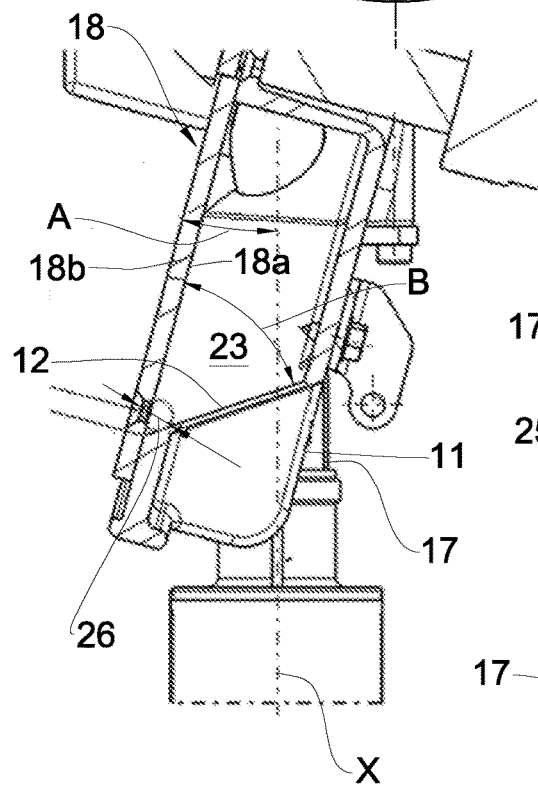
FIGS. 8 and 9 are sectional and perspective views, respectively, of a detail in FIG. 2.
Figure 9:
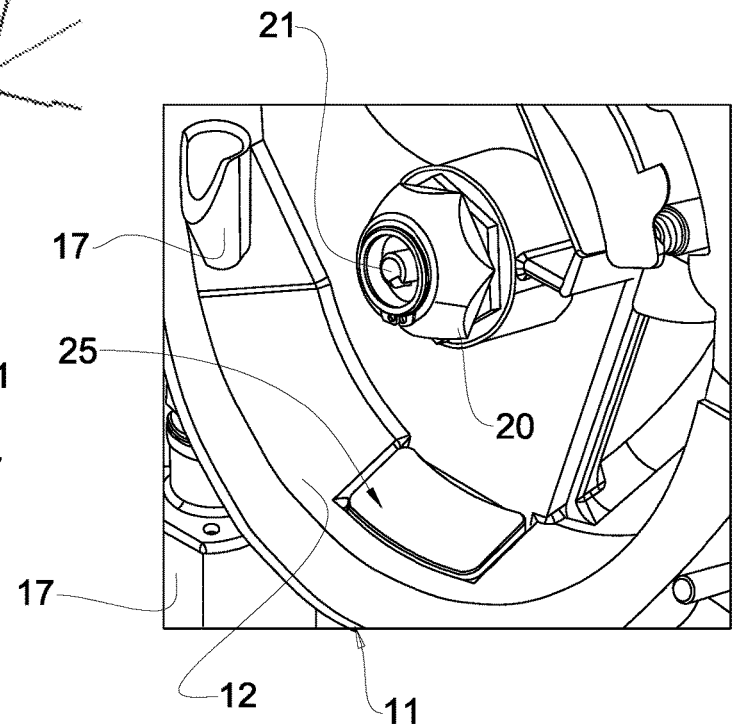

In the drawings, the reference numeral 1 indicates, as a whole, a sowing element for precision agricultural seeders. A seeder of this kind is not depicted as a whole but generally comprises, in a manner known per se, an element-holder bar to which a plurality of sowing elements 1 is fixed, the elements being spaced apart.

Each sowing element 1 comprises a frame 2, a parallelogrammical articulated mount 3 by means of which the frame 2 of the element 1 is connected to the element-holder bar, a tank comprising a hopper 4 for containing the seed, one or more coulters 5, for example disc coulters, for opening a sowing furrow, a pair of wheels 6 for regulating the sowing depth and a furrow-covering device 7 for closing the furrow opened by the coulters 5 and thereby recovering the seed.

The reference numeral 10 indicates, as a whole, a device for selecting the seed, which device is fed by gravity from the hopper 4 and is designed a distribute one seed at a time at a correct depth and spacing in the sowing furrow.

According to one preferred embodiment, the seed selection device 10 comprises a box-shaped body 11 that is fixedly mounted on the frame 2 and is provided with an opening that is removably closed by a cover 13. The box-shaped body and cover can be hinged to one another or, more simply, connected by means of screws 14, the loosening of which allows the cover to be completely taken off the opening on which it rests.

A connector 15 is preferably made in the box-shaped body 11, with which connector the tank 4, an air vent 16 and a seed descent duct 17 engage. A selection disc 18 engages with the driving shaft 21 of an electric motor 22 or other device, preferably by means of a polygonal coupling 19 and relative hub 20, in order to drag the disc into rotation about the axis thereof.

In one embodiment, a chamber 23 for drawing the seed is defined between the bottom 12 of the box-shaped body 11 and the selection disc 18. By means of a shutter 24 arranged downstream of the connector 15, it is possible to regulate the flow of seeds falling from the hopper 4 into the chamber 23 in order to divide said flow or optionally interrupt it. According to a further aspect, an inspection door 25 is provided, preferably in the lowest part of the chamber 23, so as to allow the chamber to be completely emptied if necessary.

The selection disc 18 is peripherally engaged by one or more crowns of holes 26 that pass between the opposing faces 18a, b thereof. In one embodiment, the distance between the mean circumference on which the holes 26 lie and the maximum circumference of the chamber 23 is equal to the radius of a large seed of between approximately 2 and 6 mm.

Defined as a vertical plane X that contains the axis of the seed descent duct and the plane of oscillation of the parallelogrammical articulated mount 3, the plane at which the selection disc 18 lies, parallel to the faces 18a, b, is preferably inclined by an angle A of between 10° and 20° with respect to the vertical plane X, a preferred value of inclination being approximately 15°.

According to a preferred embodiment, the bottom 12 of the box-shaped body 11 is inclined by an angle B of approximately 50°-60° (preferred value 56°) with respect to the plane at which the disc 18 lies and the bottom surface of the chamber 23 (the surface in which the door 25 is made) in such a way that the seed always tends to descend towards the selection disc 18 and that stagnation of seeds at the bottom of the chamber 23 is avoided.

A pressurisation bell 30 is idly supported on the cover 13 around a hub 31, which is preferably hollow. In one embodiment, the hub 31 is part of a pressurised duct of a pressurisation device associated with the selection disc 18 for applying a pressure differential between the two faces 18a, b.

The pressurisation device includes the pressurisation bell 30 and a pressurised distribution duct 32 which preferably extends from the hub 31 through a raised radial rib structure 36 on the cover 13. In one embodiment, the duct 32 is partially integrated in the cover 13 and partially extends in the box-shaped body 11, the two parts being joined by means of a male/female coupling connector 32a, b or a connector of another type, for example a flanged connector. According to a preferred embodiment, the part of the duct 32 that is integral with the box-shaped body 11 terminates in a first shell manifold 33 formed on the body 11. The rib structure 36 is preferably shaped so as to be raised on the cover 13 for a predominant part of the extent thereof.

According to a further aspect, the duct 32 for the part made in the rib structure 36 is integrated into the cover and is closed in turn by a cover 33b that can be removed for inspection and cleaning. It is noted that the raised position of the rib structure 36 with respect to the cover forms a handle which allows the cover 13 to be gripped and manoeuvred from and towards the body 11 using one hand.

In one embodiment, the pressurisation bell 30 is idly supported on the hub 31 by means of a washer 34 and a bearing 35 in an opposite position with respect to the selection disc 18, and is held on the hub 31 by a ring 46.

The bell 30 has a perimeter crown 37 that is raised by a disc-shaped base 37b and is in sliding peripheral contact with the selection disc 18 when (and only when) the cover 13 is closed on the opening of the box-shaped body 11, pulling said disc 18 towards the bell 30 as a consequence of the vacuum established between the disc and the bell as a result of the aspiration of air through the pressurisation device. The perimeter crown is sized such that it contacts the surface 18b of the disc along a surface which lies outside the crown of holes 26. This therefore results in the bell being dragged into rotation together with the disc, which can occur preferably by means of friction between the bell and the disc and more precisely by means of friction between the perimeter margin of the disc and the perimeter crown 37 of the bell. Alternatively, the connection between the bell 30 and the disc 18 can be provided by a mechanical coupling between the bell and the disc, for example by means of one or more teeth that can be mutually coupled when the perimeter crown 37 of the bell couples to the surface of the disc 18 when the cover 13 is closed on the corresponding opening of the box-shaped body. When the cover 13 is removed from the opening of the box-shaped body 11, the bell 30 and the disc 18 are mutually decoupled while remaining rotatably supported on the cover 13 and on the stationary part of the box-shaped body, respectively.

Figures 10, 11:
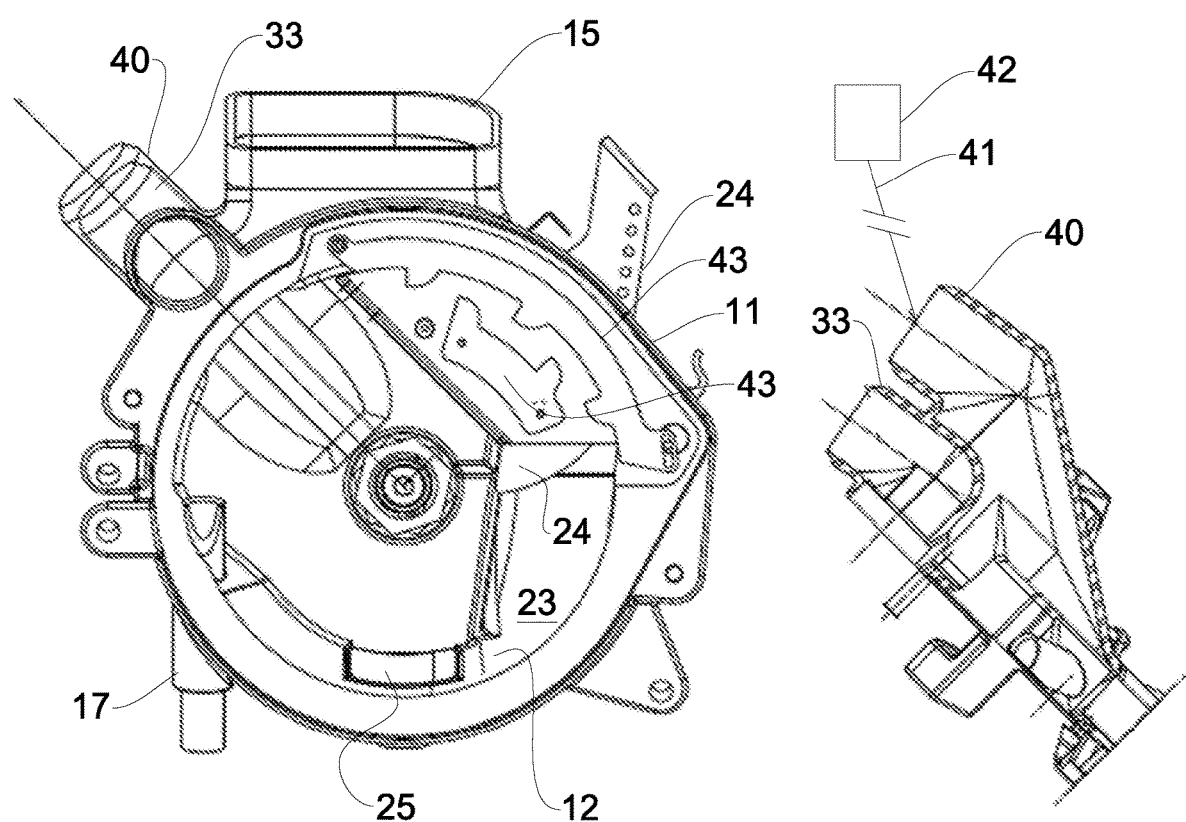
FIGS. 10 and 11 are a front elevation and sectional view along the line XI-XI in FIG. 10, respectively, of a component of the detail in the preceding figures in a variant embodiment.

In one embodiment, a vacuum-breaker block 38 is mounted inside the bell 30, so as to be stationary, by means of a flat spring 39. The block 38 can be formed in two or more adjacent independent portions, each being stressed against the surface 18b of the disc so as to interrupt the pressure differential at the holes 26 which pass in front thereof over the entire transit course controlled by the block 38. This causes the seed detained at the holes 26 to fall, when passing in front of the block 38, into the sowing duct. In a variant embodiment of the invention, depicted in FIGS. 10 and 11, the air vent 16 is replaced by a second manifold 40 that is connected, by means of a tube 41, to a device 42 for filtering the pressurised air, or to a remote aspiration position where the air available for the pressurisation system is relatively clean and not perturbed. Since in this example the bell 30 is negatively pressurised, or the first manifold is connected to the aspiration inlet of a ventilation system (not shown), it is sufficient for the second manifold to be maintained at ambient pressure. However, the bell 30 can be positively pressurised, and in this case the second manifold 40 can be connected to the delivery inlet of the aforementioned ventilation system.

The sowing element 1 operates as follows.

The seeds contained in the hopper 4 are fed by gravity into the chamber 23 for drawing the seed at a flow regulated by means of the shutter 24. The seeds lying in the drawing chamber are drawn as a result of the pressure differential established between the surfaces 18a, b at the holes 26, therefore adhering to the surface of the disc 18.

Said disc is rotated at a speed that is controlled and proportional to the forward speed of the seeder on the ground by means of the motor 21, bringing the aspirated seeds through the holes 26 against the surface 18a to be passed firstly in front of a separating device 43 and then in front of the mouth of the seed descent duct, where they are released by the disc as a result of the interruption of the pressure differential caused by the vacuum-breaker block 38 and are routed to the seed descent duct 17 in order to be deposited in the sowing furrow.

The pressure differential required for the seed selection is ensured at the surface 18b of the bell 30 which, being free to rotate (idle) about the axis thereof, is dragged by the friction from the selection disc 18 by means of the contact produced with the perimeter crown 37. It is noted that the pressure differential between the two faces of the disc 18 causes said disc to adhere to the perimeter crown 37, facilitating the dragging thereof. It is also noted that this design does not require the use of sliding washers on the disc and that, even if the bell is accidentally locked, the sowing regularity is not compromised. It is also noted that the washers that are active on the bell rest on regions that have a reduced diameter with respect to the diameter of the disc 18 or of the perimeter crown 37, such that the resistant torques produced are minimal and therefore do not affect the torque of the motor that is available at the shaft 21.

If access to the disc 18 is desired in order to replace it, it is sufficient for the cover 13 to be removed by releasing the screws closing said cover. The cover can be grasped using one hand by means of the handle provided by the rib structure 36 that houses the duct 32. The cover is not connected to any tube of the pressurisation system and therefore is not prevented from being manoeuvred.

In so doing, the invention solves the problem posed while providing several further advantages.

Among these, there are the possibility of avoiding connecting tubes or other to the cover which can therefore be manoeuvred without any interference, the possibility of using air drawn through a second manifold which allows the pneumatic flow to be purified by means of filtration, decantation, cyclonic separation or other means, and the possibility, in this last case, of also mounting the second manifold on the fixed part of the seed selection device, therefore leaving the cover unhindered.

Further advantages result from the inclined positioning with respect to the vertical plane of the disc and of the wall of the chamber for drawing the seed, and from the fact that removing the bell in order to replace the disc does not interfere with the positioning and/or the regulation of possible seed separation devices that are applied to the box-shaped body in order to remove from the holes of the disc possible duplicate seeds that are adhered to the disc at the holes.

The invention claimed is:

1. A device for selecting seed and included in a sowing element for precision agricultural seeders, the device comprising:

a box-shaped body that is fixedly mounted on a frame of the sowing element and provided with an opening that is removably closed by a cover;
   a perforated disc that is rotatably supported in the box-shaped body and has opposing faces which can be subject to a pressure differential;
   a pressurisation device associated with said disc for applying said pressure differential to said faces;
   said pressurisation device including a pressurisation bell combined with said disc so as to pneumatically couple thereto in order to guarantee said pressure differential;
   wherein said bell is idly rotatably supported on said cover, is not mechanically coupled with the disc, and when the bell contacts the disc when the cover is closed on the opening of the box-shaped body, the bell is coupled to the disc for dragging.

2. The device according to claim 1, comprising a motorisation system for rotating the disc with respect to the box-shaped body, and wherein the motorisation system is kinematically connected to the disc, said bell being dragged into rotation by the disc.

3. The device according to claim 2, wherein the bell is dragged by friction between the bell and the disc.

4. The device according to claim 1, wherein said disc is supported on said box-shaped body and defines therewith a chamber for drawing the seed, said bell being supported on said cover and being removable therewith from said box-shaped body and said disc.

5. The device according to claim 1, wherein a manifold of said pressurisation device is provided on said box-shaped body.

6. The device according to claim 1, wherein the box-shaped body comprises a fixed part that is fixedly mounted on the frame of the sowing element and provided with the opening that is removably closed by the cover, wherein the cover is equipped with a raised rib structure which forms a handle for maneuvering said cover from and towards the fixed part of the box-shaped body.

7. The device according to claim 6, wherein a manifold of said pressurisation device is provided on said-box shaped body, wherein said rib structure forms a pressurised distribution duct between said manifold and said bell.

8. The device according to claim 7, wherein said rib structure is equipped with a cover that can be opened.

9. The device according to claim 1, wherein a crown of holes is provided on said disc, wherein the bell has a perimeter collar, which is in sliding contact with one of the surfaces of the disc, along one surface external to the crown of holes of said disc.

10. The device according to claim 5, wherein a second manifold is provided on said seed selection device, which manifold is pneumatically connected to an air vent of said pressurisation device.

11. The device according to claim 10, wherein the second manifold is pneumatically connected to a filtration system or to a remote aspiration system.

12. The device according to claim 10, wherein the second manifold is provided on said box-shaped body.

13. A precision agricultural seeder comprising an element-holder bar to which is fixed a plurality of sowing elements each comprising a device according to claim 1, the elements being spaced apart.

14. The device according to claim 11, wherein the second manifold is provided on said box-shaped body.

15. A device for selecting seed and included in a sowing element for precision agricultural seeders, the device comprising:

a box-shaped body that is fixedly mounted on a frame of the sowing element and provided with an opening that is removably closed by a cover;

a seed selection disc that is supported in the box-shaped body and has opposing faces which can be subject to a pressure differential;

a motorisation system for rotating the seed selection disc with respect to the box-shaped body;

a pressurisation device associated with said seed selection disc for applying said pressure differential to said faces;

said pressurisation device including a pressurisation bell combined with said seed selection disc so as to pneumatically couple thereto in order to guarantee said pressure differential;

wherein said bell is idly rotatably supported in the device for selecting seed with respect to the seed selection disc, and wherein the motorisation system is kinematically connected to the seed selection disc, the bell being dragged by friction from the seed selection disc, wherein the bell is dragged without mechanical coupling betwen the bell and the seed selection disc.

16. A device for selecting seed and included in a sowing element for precision agricultural seeders, the device comprising:

a box-shaped body that is fixedly mounted on a frame of the sowing element and provided with an opening that is removably closed by a cover;

a seed selection disc that is supported in the box-shaped body and has opposing faces which can be subject to a pressure differential;

a motorisation system for rotating the seed selection disc with respect to the box-shaped body;

a pressurisation device associated with said seed selection disc for applying said pressure differential to said faces;

said pressurisation device including a pressurisation bell combined with said seed selection disc so as to pneumatically couple thereto in order to guarantee said pressure differential;

wherein said bell is idly rotatably supported in the device for selecting seed with respect to the seed selection disc and is not mechanically coupled with the disc, and wherein the motorisation system is kinematically connected to the seed selection disc, the bell being dragged by the seed selection disc via friction resulting from the bell contacting the seed selection disc when the bell is pneumatically coupled to the seed selection disc.

* * * * *